US008197116B2

(12) United States Patent
Klein (10) Patent No.: US 8,197,116 B2
(45) Date of Patent: *Jun. 12, 2012

(54) CONVENIENCE NECTAR MIXING AND STORAGE DEVICES (76) Inventor: Arnold G. Klein, Sandia Park, NM (US)

( * ) Notice: Subject to any disclaimer, the term of this patent is extended or adjusted under 35 U.S.C. 154(b) by 1605 days.

This patent is subject to a terminal disclaimer.

(21) Appl. No.: 11/363,714

(22) Filed: Feb. 28, 2006

(65) Prior Publication Data

US 2006/0153000 A1 Jul. 13, 2006

Related U.S. Application Data (63) Continuation-in-part of application No. 10/200,747, filed on Jul. 24, 2002, now Pat. No. 8,147,119.

(60) Provisional application No. 60/309,264, filed on Aug. 2, 2001.

(51) Int. Cl.
B01F 3/12 (2006.01)
(52) U.S. Cl. ........... 366/130; 119/72; 206/219; 220/533
(58) Field of Classification Search ................. 366/130; 206/219; 222/145.5; 220/529, 532, 533, 220/254.1, 212; 73/426–429; 119/72, 72.5; 141/95
See application file for complete search history.

(56) References Cited

U.S. PATENT DOCUMENTS

| 580,899 | A | * | 4/1897 | Roberts ........................ 220/533 |
| 641,052 | A | * | 1/1900 | Strauss ........................... 73/427 |
| 645,875 | A | * | 3/1900 | Strauss ........................... 73/428 |
| 897,458 | A | * | 9/1908 | Dickeson ........................ 73/429 |
| 1,168,027 | A | * | 1/1916 | Nirdlinger ...................... 73/426 |
| 1,461,486 | A | * | 7/1923 | Kishpaugh ...................... 222/42 |
| 1,464,273 | A | * | 8/1923 | Schopflocher ................. 206/219 |
| 1,523,136 | A | * | 1/1925 | O'Connor ..................... 220/533 |
| 1,706,334 | A | * | 3/1929 | Toch |
| 1,885,757 | A | * | 11/1932 | Orlopp ........................... 206/219 |
| 2,020,373 | A | * | 11/1935 | Petzold, Jr. ................... 220/533 |
| 2,081,078 | A | * | 5/1937 | Watson ....................... 126/373.1 |
| 2,221,024 | A | * | 11/1940 | Hood ............................ 220/533 |
| 2,558,998 | A | * | 7/1951 | Yearout ........................... 222/49 |
| 2,586,925 | A | * | 2/1952 | Drengberg .................... 220/533 |
| 2,625,973 | A | * | 1/1953 | Weldon et al. .............. 206/459.5 |
| 2,634,705 | A | * | 4/1953 | Mayes .......................... 119/57.8 |
| 2,645,127 | A | * | 7/1953 | Parks .............................. 73/429 |
| 2,764,157 | A | * | 9/1956 | Fernandez et al. ............. 206/221 |
| 2,787,268 | A | * | 4/1957 | Greenspan .................... 206/221 |
| 2,788,912 | A | * | 4/1957 | Simonsen ..................... 220/533 |
| 2,793,776 | A | * | 5/1957 | Lipari ........................... 206/221 |

(Continued)

Primary Examiner — Charles E Cooley
(74) Attorney, Agent, or Firm — Robert W. Becker; Louis W. Tompros; Larissa B. Park (57) ABSTRACT The Convenience Nectar Mixing and Storage Device consists of a container that is divided proportionately to allow for the precise measuring of the recommended sugar to water ratios used for nectar type bird and butterfly feeders. The device is adapted for supporting a movable or removable divider that separates the container into proportionate volumes, 4 to 1, 6 to 1, and 9 to 1 that correspond to the commonly recommended sugar to water ratios for hummingbird, oriole, and butterfly nectar feeders. The device allows for the water and sugar compartments to be filled to the same "line of sight" level to facilitate the making of precise nectar sugar to water ratios. Once the sugar and water compartments are filled to the same level, the divider is moved or removed to allow for mixing. In the preferred embodiment of the Convenience Nectar Mixing and Storage Devices, the container divider can be used as a stirring implement and lid to cover the container during storage.

12 Claims, 8 Drawing Sheets

U.S. PATENT DOCUMENTS

| | | | | |
|---|---|---|---|---|
| 2,813,649 | A * | 11/1957 | Lipari | 215/11.1 |
| 2,985,333 | A * | 5/1961 | Kirkman | 220/533 |
| 3,200,983 | A * | 8/1965 | Walter | 220/533 |
| 3,221,917 | A * | 12/1965 | De Santo et al. | 220/502 |
| 3,321,097 | A * | 5/1967 | Solowey | 206/221 |
| 3,400,855 | A * | 9/1968 | Alexander | 220/719 |
| 3,554,429 | A * | 1/1971 | Cohen | 229/120.34 |
| 3,658,204 | A * | 4/1972 | Bottger | 220/23.4 |
| 3,877,877 | A * | 4/1975 | Prosen | 422/51 |
| 3,948,105 | A * | 4/1976 | Johnson, Jr. | 73/427 |
| 4,116,071 | A * | 9/1978 | Sakura | 73/429 |
| D258,796 | S * | 4/1981 | Paulides | D7/513 |
| 4,292,846 | A * | 10/1981 | Barnett | 73/427 |
| 4,293,008 | A * | 10/1981 | Coleman | 141/95 |
| 4,294,372 | A * | 10/1981 | Onishi | 220/501 |
| 4,301,942 | A * | 11/1981 | Kupperman et al. | 220/592.17 |
| 4,436,215 | A * | 3/1984 | Kleinert et al. | 220/533 |
| 4,480,470 | A * | 11/1984 | Tussing | 73/427 |
| 4,577,773 | A * | 3/1986 | Bitel | 220/533 |
| 4,722,453 | A * | 2/1988 | Hamilton | 220/533 |
| 4,743,236 | A * | 5/1988 | Manschot | 604/323 |
| 4,762,251 | A * | 8/1988 | Berger | 222/49 |
| 4,807,760 | A * | 2/1989 | Sussman | 206/581 |
| 4,860,927 | A * | 8/1989 | Grinde | 222/158 |
| 4,889,232 | A * | 12/1989 | Asleson | 206/449 |
| 4,978,018 | A * | 12/1990 | Wood | 220/531 |
| 5,085,342 | A * | 2/1992 | Strawder | 220/495.09 |
| D324,933 | S * | 3/1992 | Giacobe et al. | D34/7 |
| 5,123,460 | A * | 6/1992 | Reed | 141/95 |
| 5,167,433 | A * | 12/1992 | Ryan | 296/37.1 |
| 5,299,688 | A * | 4/1994 | McKay et al. | 206/425 |
| 5,406,995 | A * | 4/1995 | Gantzer | 141/325 |
| D361,532 | S * | 8/1995 | North et al. | D10/46.3 |
| 5,447,245 | A * | 9/1995 | Merhar | 215/6 |
| 5,615,797 | A * | 4/1997 | Ripamonti | 220/529 |
| 5,634,714 | A * | 6/1997 | Guild | 366/130 |
| 5,875,888 | A * | 3/1999 | Albisetti | 206/221 |
| 6,497,344 | B1 * | 12/2002 | Dial | 222/144.5 |
| 6,736,536 | B2 * | 5/2004 | Jacobs et al. | 366/130 |
| 7,748,347 | B2 * | 7/2010 | Richmond | 119/72 |
| 7,806,081 | B2 * | 10/2010 | Colvin et al. | 119/72 |
| 8,028,658 | B2 * | 10/2011 | Stone et al. | 119/72 |
| 8,100,085 | B2 * | 1/2012 | Stone et al. | 119/72 |
| 8,147,119 | B2 * | 4/2012 | Klein | 366/130 |
| 2003/0026164 | A1 * | 2/2003 | Klein | 366/130 |
| 2003/0160052 | A1 * | 8/2003 | Mulaw | 220/532 |
| 2005/0011261 | A1 * | 1/2005 | Lyon | 73/427 |
| 2006/0090707 | A1 * | 5/2006 | Donegan | 119/72 |
| 2006/0153000 | A1 * | 7/2006 | Klein | 366/130 |
| 2010/0011855 | A1 * | 1/2010 | Yip | 73/426 |
| 2010/0251967 | A1 * | 10/2010 | Mateer et al. | 119/77 |
| 2011/0011345 | A1 * | 1/2011 | LoRocco et al. | 119/72 |
| 2011/0239949 | A1 * | 10/2011 | Abbott | 119/72 |
| 2012/0060762 | A1 * | 3/2012 | Cowger et al. | 119/74 |

* cited by examiner

FIG-17
"LINE-OF-SIGHT"

"LINE-OF-SIGHT"

CONVENIENCE NECTAR MIXING AND STORAGE DEVICES

This is a CIP application of U.S. patent application Ser. No. 10/200,747, now U.S. Pat. No. 8,147,119 B2 issued Apr. 3, 2012.

I also claim the benefit of provisional patent application No. 60/309,264 filed Aug. 2, 2001.

FIELD OF THE INVENTION

The present invention relates to a device to be used to mix and store sugar water (nectar) for nectar type bird and butterfly feeders. The present invention allows for conveniently measuring, mixing and storing the precise proportions of sugar and water required for hummingbird, oriole and butterfly nectar feeders.

BACKGROUND OF THE INVENTION

The popularity of nectar type feeders (sugar-water) for the feeding of hummingbirds, orioles and even butterflies is ever increasing. At the same time, there is extensive research showing that certain sugar to water proportions are preferred by the birds and butterflies, these proportions being more or less equivalent in sugar content with their natural food sources.

As anyone in the nectar feeder manufacturing and or bird feeding specialty retailing business will attest, customers (consumers) are constantly asking and needing to be reminded about correct nectar (sugar to water proportions) recipes and how they should prepare the nectar for their feeders. Further, there are increasing concerns among bird feeding authorities that feeding birds with nectar that is disproportionately sweeter (higher sugar to water ratio) than their natural food sources may have an adverse effect on the birds health if used over the long term. There are similar concerns about using the commercially available nectar concentrates which have concentrated artificial coloring and/or flavorings.

There is clearly a need for a device to simplify the mixing of sugar and water to arrive at the correct sugar to water proportion for hummingbird, oriole and butterfly nectar feeders. At the present time, the currently recommended sugar to water proportions are:

Hummingbird Feeder Nectar—1 part table sugar to 4 parts water
Oriole Feeder Nectar—1 part table sugar to 6 parts water
Butterfly Feeder Nectar—1 part table sugar to 9 parts water These nectar (sugar to water) proportions are currently recognized as being proportionally equivalent in sugar content as the birds, and butterflies natural nectar food sources. As research continues, adjustments to these proportions may be recommended.

The principal object of the present invention is to provide a device for a nectar mixing and storage that simplifies and makes convenient getting the correct proportion of sugar to water ratios(s) for the various types of nectar feeders, hummingbird, oriole, and butterfly. An additional objective of the present invention is to allow the user to prepare a relatively large quantity of nectar, that can be stored in a refrigerator, without concern for spoilage for several weeks.

SUMMARY OF THE INVENTION

A nectar mixing and storage device that simplifies the proportionate measurement of sugar and water for bird and butterfly nectar feeders. The nectar mixing and storage device has separate compartments that are used to measure out the required amounts of sugar to water needed to make hummingbird (1 part sugar/4 parts water), oriole (1 part sugar/6 parts water) and butterfly (1 part sugar/9 parts water) nectar. The device allows for precise sugar to water mixtures based on filling the divided compartments to the same level. Once the sugar and water have been filled to the same level, the compartment divider is removed and the sugar and water may be stirred. In the preferred embodiment, the divider is placed in the appropriate position as indicated by graphics or other means to divide the compartments for the convenient preparation of hummingbird, oriole or butterfly nectar. In the preferred embodiment of the device, the compartment divider can be used as a stirring implement and lid to cover the contents.

Other and further objects of the present invention will be apparent from the following description and claims, and are illustrated in the accompanying drawings, which by way of illustration, show a series of embodiments of the present invention and the principles thereof, and what is now considered to be the best mode in which to apply these principles. Other and different embodiments of the invention embodying the same or equivalent principles may be used and structural changes may be made as desired by those skilled in the art without departing from this invention.

BRIEF DESCRIPTION OF THE DRAWINGS

FIG. 14-A depicts an enlarged, partial view of FIG. 14;

DESCRIPTION

Figure 1:
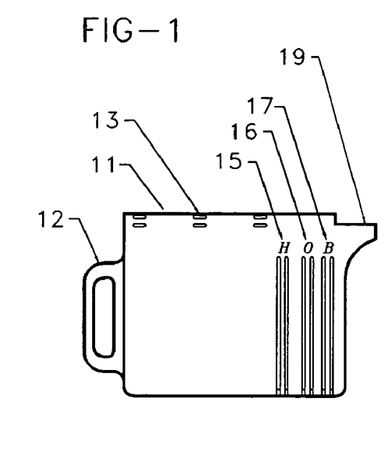
FIG. 1 depicts an oblique side view of the convenience nectar mixing and storage device.
Figure 2:
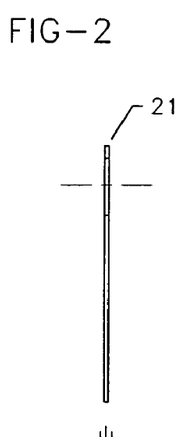
FIG. 2 depicts a side view of the lid/divider for the convenience nectar mixing and storage device.
Figure 2A:
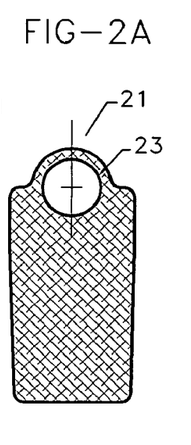
FIG. 2A depicts a top view of the lid/divider for the convenience nectar mixing and storage device.
Figure 3:
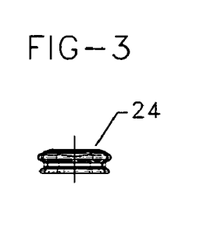
FIG. 3 depicts a side view of a stopper for the lid/divider for the convenience nectar mixing and storage device.
Figure 4:
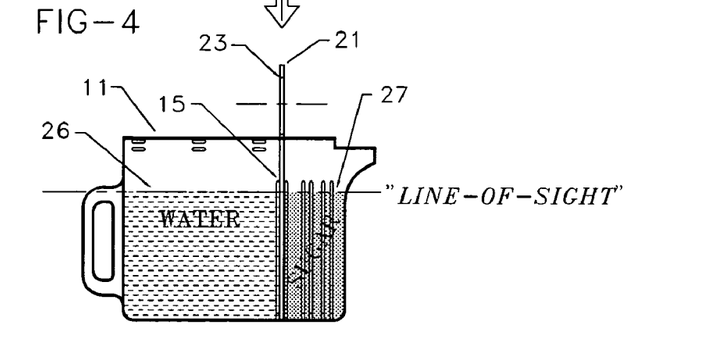
FIG. 4 depicts a side view showing the lid/divider installed and the sugar water level of the convenience nectar mixing and storage device.

The first embodiment of the CONVENIENCE NECTAR MIXING AND STORAGE DEVICE is shown in the FIGS. 1-7. The device 11 shown in side view (FIG. 1) has a handle 12 and pouring spout 19. The device 11 has a series of rails as shown at 15, 16 and 17 that when engaged with the divider 21 (FIGS. 2 and 2A) will allow for the creation of two (2) separate compartments within the device. The separate compartments as shown in FIG. 4 will allow for separating the sugar 27 and water 25 components in the device 11. The rails 15, 16 and 17 are located to divide the device 11 into proportionate volumes of 4 to 1-"H" (hummingbird), 6 to 1-"O" (oriole), and 9 to 1-"B" (butterfly) respectively. The rails 15, 16 and 17 may be identified through decoration or embossment for hummingbird nectar, oriole nectar, and butterfly nectar respectively.

Using the device 11, it is now a very simple procedure to mix the correct sugar to water ratio for the nectar feeder type. The divider 21 is pushed down into the appropriate rail 15, 16 or 17. The sugar is added to the smaller side and the water is added to the larger side—both levels being on the same "LINE-OF-SIGHT" as shown in FIG. 4. The divider 21 may be made from a semi-resilient material to aid in sealing between the compartments.

Figure 5:
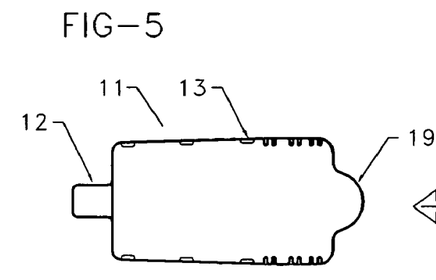
FIG. 5 depicts a top view of the convenience nectar mixing and storage device.
Figure 6:
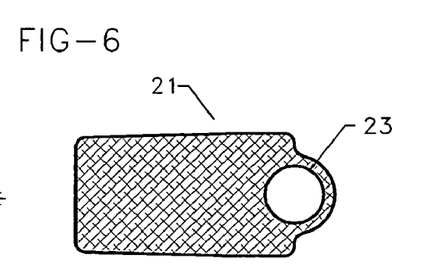
FIG. 6 depicts a top view of the lid/divider for the convenience nectar mixing and storage device.
Figure 7:
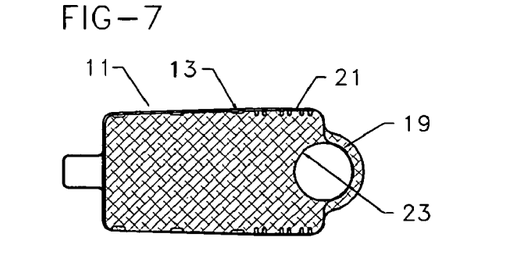
FIG. 7 depicts a top view of the convenience nectar mixing and storage device with the lid installed.
Figure 8:
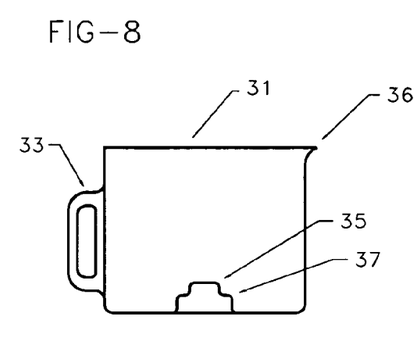
FIG. 8 depicts a side view of a second embodiment of the convenience nectar mixing and storage device.
Figure 9:
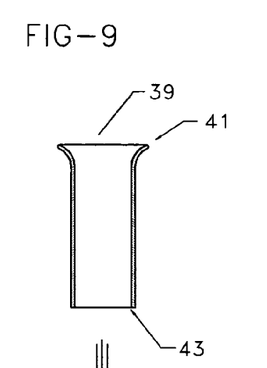
FIG. 9 depicts side view of a removable sugar container/divider of the second embodiment of the convenience nectar mixing and storage device.

Once the sugar 27 and water 25 are put in the device 11, the divider 21 is pulled out and may be used to stir the solution. The divider 21 can then be used as a lid for the device 11 as shown in FIGS. 5-7. The divider 21 is configured to engage between the raised nodes 13 as shown in FIGS. 5,7. The divider 21 is shown with a pouring hole 23 that aligns with the device 11 pouring spout 19 to facilitate pouring. Finally, the divider 21 with hole 23 may be closed with a separate or integrally formed resilient plug 24 as shown in FIG. 3.

Figure 10:
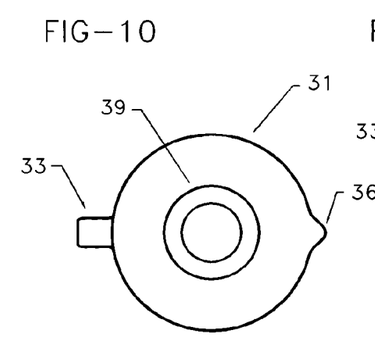
FIG. 10 depicts a top view of the second embodiment of the convenience nectar mixing and storage device.
Figure 11:
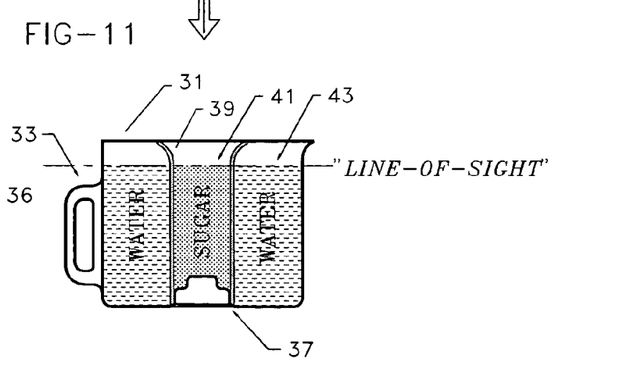
FIG. 11 depicts a side view showing the sugar container divider installed and the sugar/water level of the second embodiment of the convenience nectar mixing and storage device.
Figure 12:
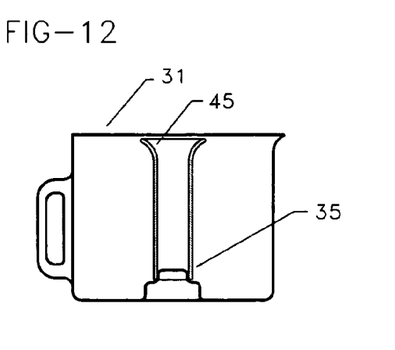
FIG. 12 depicts a side view of the second embodiment of the convenience nectar mixing and storage device with a smaller sugar container divider as would be used for oriole and/or butterfly nectar.

An alternate embodiment of the convenience nectar making and storage device is shown in the FIGS. 8-12. The device 31 has a handle 33 and pouring spout 36. This device 31 has a raised bottom feature as shown at 37 designed to form an interference fit with the bottom of a tubular form divider 39. The divider 39 has a flared top as shown at 41 to facilitate filling. The device is used as shown in FIG. 10 and FIG. 11 by engaging the bottom of the tubular divider 39 with the raised bottom feature 37 to create two (2) proportionate chambers in the device 31. The tubular form divider 39 may be formed of a semi-resilient material to facilitate its fit and seal with the raised bottom feature 37. It is then a simple matter to fill the tubular divider 39 with sugar 41 and to fill the surrounding container with water 43 to the same "LINE-OF-SIGHT"

level. The tubular divider 39 is sized to create a sugar 41 to water 43 proportion of 1 to 4 as recommended for hummingbird feeders. Once the water 43 and sugar 41 are added into the device the tubular divider 39 is pulled out, and the nectar solution is stirred. FIG. 12 shows a smaller tubular divider 45 sized to engage with the upper portion 35 of the device 31 raised bottom feature 37. This smaller sized tubular divider 45 is intended to show the relatively smaller sugar to water ratio as used for an oriole or butterfly feeder. The CONVENIENCE NECTAR MIXING AND STORAGE DEVICE of FIGS. 8-12 may be configured to fit up to three (3) different sizes of tubular dividers to allow for convenient mixing of hummingbird, oriole, or butterfly nectar.

Figure 13:
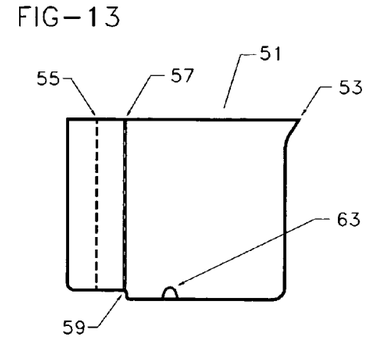
FIG. 13 depicts a side view of the convenience nectar mixing and storage device with an integrally formed divider.
Figure 14:
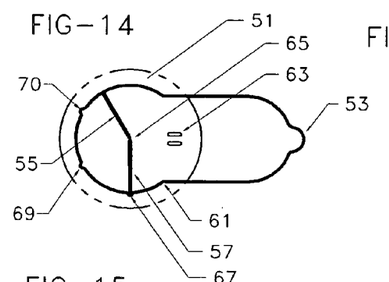
FIG. 14 depicts a top view of the convenience nectar mixing and storage device with the integrally formed divider set in a position to make hummingbird nectar.
Figure 14A:
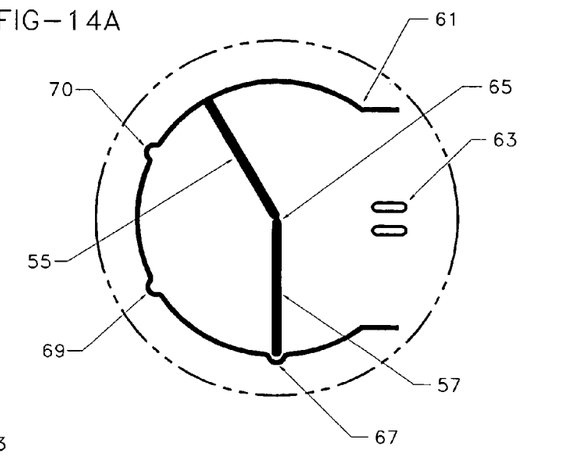
Figure 15:
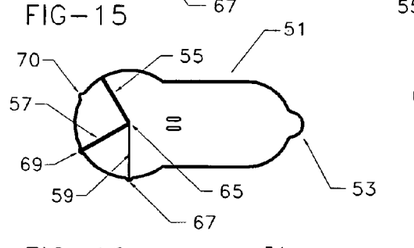
FIG. 15 depicts a top view of the convenience nectar mixing and storage device with the integral divider set in a position to make oriole nectar.
Figure 16:
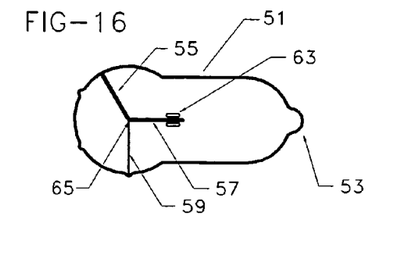
FIG. 16 depicts a top view of the convenience nectar mixing and storage device with the integral divider set to the solution mixing position.
Figure 17:
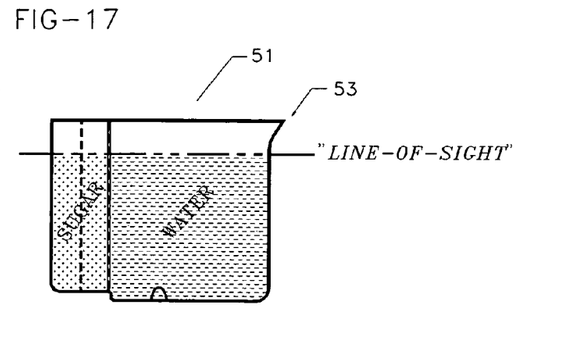
FIG. 17 depicts a side view of the convenience nectar mixing and storage device with integral divider with the sugar and water compartments filled, prior to mixing.

A convenience nectar mixing and storage device with an integrally formed divider is shown in the FIGS. 13-17. The device container 51 has a pouring spout 53 and an integrally formed, fixed divider panel 55. As shown in FIG. 14A, the divider panel 55 is formed integrally with the container 51 bottom and side walls up to the thin section of the hinge 65 at which point the moveable divider panel 57 begins. As seen in FIG. 13, there is a step 59 provided in the bottom of the device container 51 to allow for integrally molding the moveable divider panel 57. The FIG. 14A shows a series of detents 67, 69 and 70 that are formed in the sidewalls of the device container 51. These detents are shaped to allow for rotary engagement of the edge of the moveable divider panel 57. Positioning the moveable divider panel 57 in any of the detents 67, 69 or 70 will subdivide the container 51 into two compartments that have proportionate volumes that are conveniently set for the formulation of Hummingbird, Oriole and Butterfly nectar, respectively. The moveable divider panel 57 may have ridges, bumps or other adaptations in its upper section to aid the user in rotating it into and out of engagement with the container 51 sidewall detents 67, 69 and 70. The walls of the container 51 will typically have embossed or decorated graphics adjacent to the detents 67, 69 and 70 that designate the associated nectar formulations (Hummingbird, Oriole or Butterfly). The separate compartments will typically be identified with embossed or decorated words or symbols for indicating that the smaller one is for sugar and the larger one for water. The distal and bottom edges of the moveable divider panel 57 may be formed with a reduced or "feathered" cross section and/or slightly curved shape. This feathered edge will allow for reduced force for rotating the panel 57 and as an aid in forming a flexible or "wiper" type seal with the detents 67, 69 and 70 and the container 51 inside, bottom surface. The FIG. 16 shows the moveable divider panel 57 rotated to a neutral or "mixing" position and there being held in place with integral nodes 63 that project upward from the bottom of the container 51. Another neutral or "mixing" position may be constructed with a container bottom or sidewall projection positioned to hold the moveable divider panel 57 completely folded back close to, or in direct contact with the fixed divider panel 55. The device container 51 is not shown with a separate handle, but the circular shape transition at 61 should allow the user to grasp and hold the container. Although not shown in the drawing figures, a separate handle or more radically indented form at the shape transition 61 may be provided as an aid in handling. The FIG. 17 shows the convenience nectar mixing and storage device container 51 with the temporarily divided sugar and water compartments filled to the same "Line of Sight" level. This equivalent level feature automatically sets the correct sugar to water ratio for the selected (Hummingbird, Oriole or Butterfly) nectar solution irrespective of the total amount of nectar that is being prepared. The drawing FIGS. 13-17 do not show a lid or top to the device container 51, but typically a lid would be provided. This lid will fit over the device container 51 using a snap or friction interference fit as well established for refrigerator containers and the like. Given the possibility that the nectar solution may be microwave heated (to reduce spoilage) it is desirable for the lid to be vented in order to allow steam to escape. The lid may also be provided with a secondary opening located adjacent to the container spout to allow for convenient pouring without requiring removal of the entire lid.

Figures 18, 19, 20, 21, 22, 23, 24, 25:
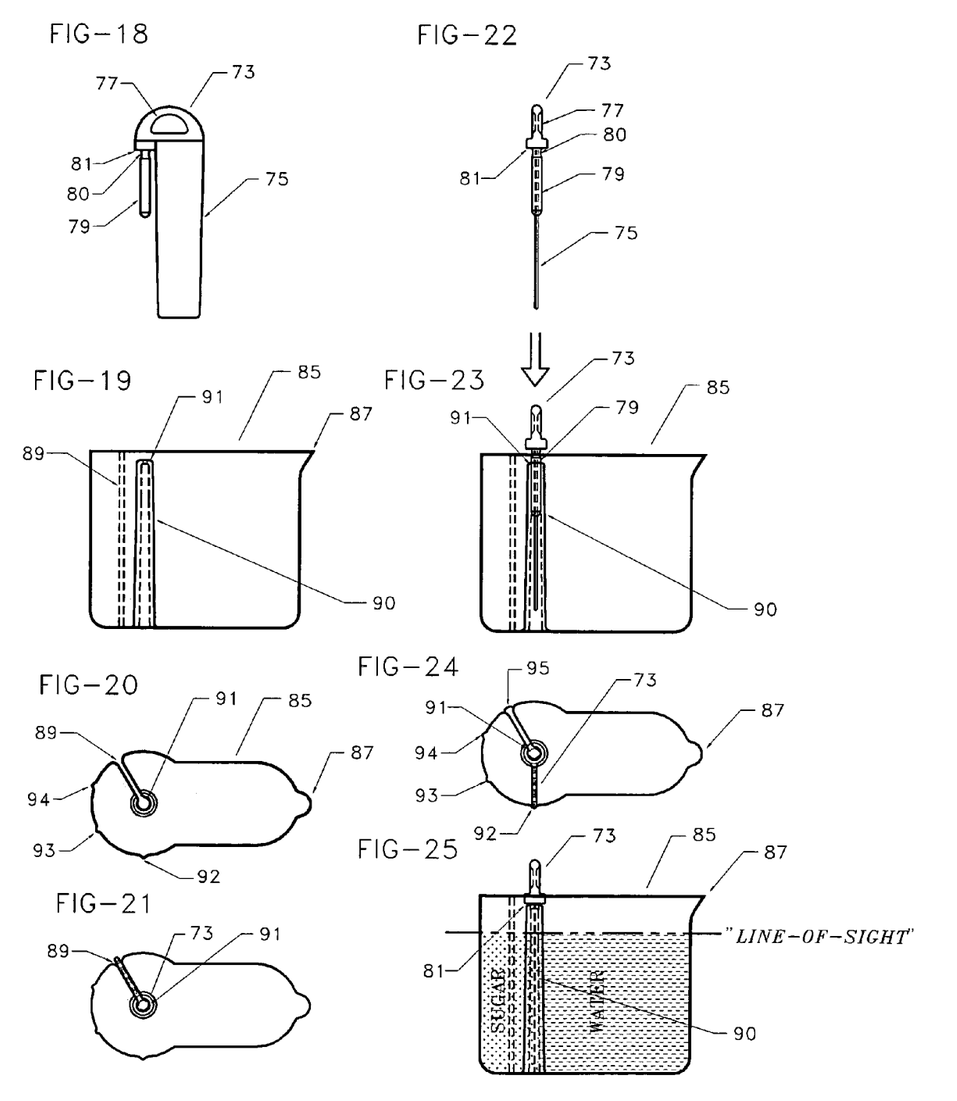
FIG. 18 depicts a side view of the removable rotary divider of the convenience nectar mixing and storage device.
FIG. 19 depicts a side view of the rotary divider supporting container of the convenience nectar mixing and storage device.
FIG. 20 depicts a top view of the rotary divider supporting container of the convenience nectar mixing and storage device.
FIG. 21 depicts a top view of the rotary divider supporting container of the convenience nectar mixing and storage device with the rotary divider located in the integral storage slot.
FIG. 22 depicts a rotated side view of the rotary divider of FIG. 18.
FIG. 23 depicts a side view of the rotary divider supporting container of the convenience nectar mixing and storage device with the rotary divider set in a position to make hummingbird nectar.
FIG. 24 depicts a top view of the rotary divider supporting container of the convenience nectar mixing and storage device with the rotary divider set in a position to make hummingbird nectar.
FIG. 25 depicts a side view of the rotary divider supporting container of the convenience nectar mixing and storage device with the sugar and water compartments filled, prior to mixing.

A convenience nectar mixing and storage device with a rotary divider is shown in the FIGS. 18-25. The convenience nectar mixing and storage device container 85 is configured to receive a rotary divider 73 as shown in FIGS. 22 and 23. The device container 85 has a pouring spout 87 and an upstanding support 90 that is adapted to receive the guide pin 79 of a rotary divider 73. The rotary divider 73 has a semicircular, cutout form 77 on top to aid in manual rotation and removal. The upper portion of the rotary divider 73 guide pin 79 has a slight undercut shown at 80. This undercut 80 forms a light snap fit with the hole 91 in the top of the upstanding support 90. The rotary divider 73 guide pin 79 is further supported when fully engaged in the upstanding support 90 by a flat boss surface at 81. As shown in FIG. 24, the device container 85 is configured with a series of detents 92, 93 and 94 that when engaged by the edge 75 of the rotary divider 73 serve to subdivide the container 85 into two compartments that have proportionate volumes that are conveniently set for the formulation of Hummingbird, Oriole and Butterfly nectar, respectively. The walls of the container 85 will typically have embossed or decorated graphics that specifically identify the sugar and water compartments and the associated nectar formulation detent(s) (Hummingbird, Oriole or Butterfly). As shown in FIGS. 20 and 21, a radial slot 89 is provided in the device container 85 to conveniently store the rotary divider 73 after the nectar solution is prepared. The FIG. 24 shows an alternative configuration where the slot 89 may include a bottom and slightly upstanding partial wall 95, forming a shallow basin to catch any small drips that result when the rotary divider 73 is placed there. The FIG. 25 shows the convenience nectar mixing and storage device container 85 with the temporarily divided sugar and water compartments filled to the same "Line of Sight" level. The drawing FIG. 25 does not show a lid or top to the device container 85, but typically a lid with a raised profile adapted to provide clearance for the rotary divider 73 would be provided. This lid would be provided with an incorporated vent for releasing steam and a secondary opening for convenient dispensing adjacent to the container spout.

Figures 26, 31:
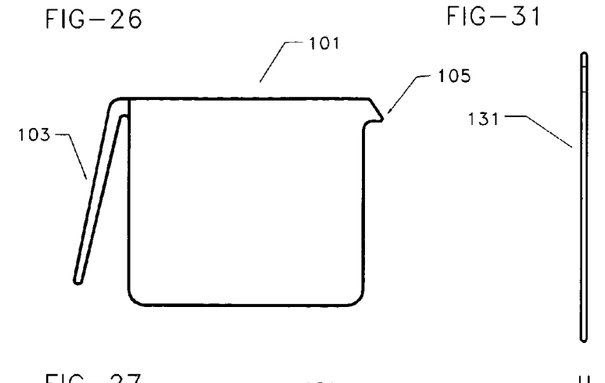
FIG. 26 depicts a side view of the container of the convenience nectar mixing and storage device with lid supported divider.
FIG. 31 depicts a side view of the divider of the convenience nectar mixing and storage device.
Figures 27, 28, 33:
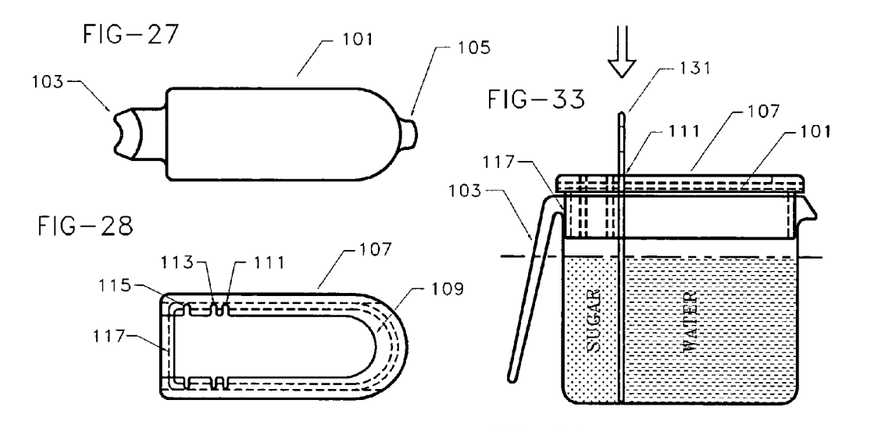
FIG. 27 depicts a top view of the container of the convenience nectar mixing and storage device with lid supported divider.
FIG. 28 depicts a top view of the divider supporting lid of the convenience nectar mixing and storage device.
FIG. 33 depicts a side view of the divider supporting lid with the divider extending into the container of the convenience nectar mixing and storage device and the sugar and water compartments filled, prior to mixing.
Figures 29, 30, 34:
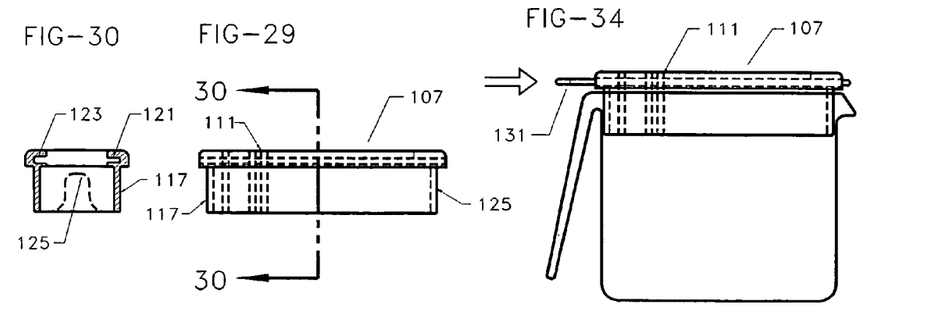
FIG. 29 depicts a side view of the divider supporting lid of the convenience nectar mixing and storage device.
FIG. 30 depicts a cross sectional view of the divider supporting lid of FIG. 29.
FIG. 34 depicts a side view of the divider supporting lid with the divider located in the transverse lid slot to close off the lid for the convenience nectar mixing and storage device.
Figure 32:
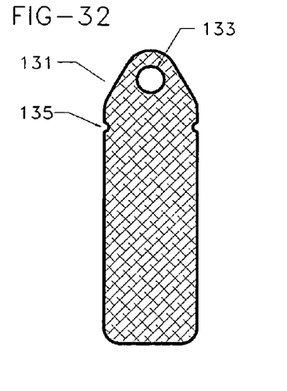
FIG. 32 depicts a front view of the divider of the convenience nectar mixing and storage device.
Figure 35:
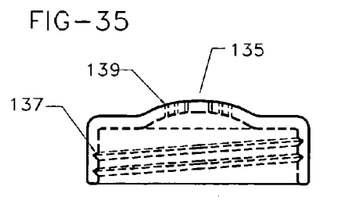
FIG. 35 depicts a side view of the closure lid of the of the fixed divider container of the convenience nectar mixing and storage device.

Referring to the FIGS. 26-34 there is shown a convenience nectar mixing and storage device with a divider supporting lid. As seen in FIGS. 26 and 27 the device container 101 has a handle 103 and a pouring spout 105. As shown in the FIG. 28 the lid 107 has a large access opening 109 to allow the user to add the sugar and water to the container 101. The lid 107 has transverse slots 111, 113 and 115 that support a divider 131 for dividing the container into the correct volumetric ratios for the formulation of hummingbird, oriole and/or butterfly nectar respectively. The lid 107 may have embossed or decorated graphics that serve to identify the transverse slots 111, 113 and 115 with associated nectar formulations. The container 101 may have embossed or decorated graphics to identify the "sugar" and "water" compartments and the relative divider locations for the different nectar formulations. The transverse slots 111, 113 and 115 are shown to be narrower on one side of the lid 107 than the other to allow the divider to engage them in only one orientation. This specific divider orientation is necessary to maintain accurate compartment volumetric ratios in the event that the divider has a contoured, rather than planar, form. The FIGS. 28 and 29 show an extending wall 117 that when interference fitted into the inside of the container 101 acts to hold the lid 107 secure. The FIG. 30, section view of the lid 107, shows longitudinal slots 121 and 123 that are adapted to receive the divider 131. These longitudinal slots are shown having different widths to allow for a "keyed" or one-way-orientation of the divider. FIG. 30 shows a cutout region 125 in the extending wall 117 that allows the nectar to be dispensed from the pouring spout 105 even while the lid 107 is installed on the container 101. This cutout region 125 is also provided to allow an escape route for steam in the event that the nectar mixture is microwaved, or otherwise heated. The FIGS. 31 and 32 show the (planar form) divider 131 with a handling feature (hole) at 133. The divider 131 has a detent at 135 to aid in holding the divider 131 in place when fulled engaged with any of the transverse slots 111, 113 and 115 of lid 107. The divider 131 is made with an adaptive shape or outline to allow adequate sealing of the separate compartments of the container 107. The divider 131 may be made of a flexible or semi-flexible material and/or may have a reduced cross section at the edges to assist in sealing between the container compartments. Although not specifically required, the container 107 may have internal projecting nodes or other adaptive features to aid in aligning and/or sealing the divider 131. The FIG. 33 shows the lid 107 and divider 131 fully engaged with the container 101. The divider 131, when fully inserted into the transverse slot 111 separates the container 101 into sugar and water compartments for the correct formulation of hummingbird nectar. Once the sugar and water are added to the same line-of-sight level, the divider can be removed and may be used to stir the nectar solution. The FIG. 34 shows the divider 131 inserted longitudinally into the lid 107, effectively closing the lid opening 109 for spill resistant storage of the nectar.

Figure 36:
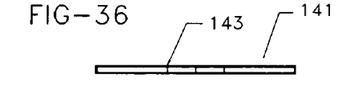
FIG. 36 depicts a side view of the lid sealing gasket of the of the fixed divider container of the convenience nectar mixing and storage device.
Figure 37:
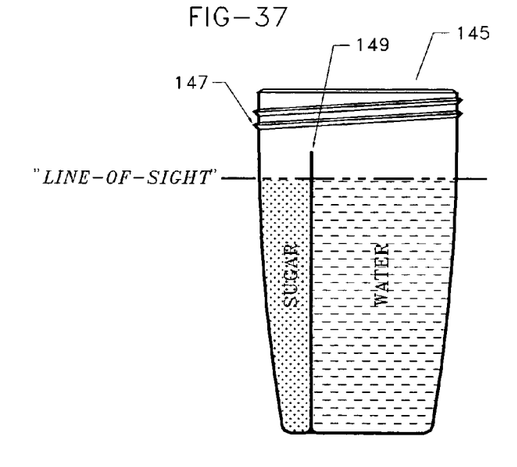
FIG. 37 depicts a side view of the container of the convenience nectar mixing and storage device with a fixed divider.
Figure 38:
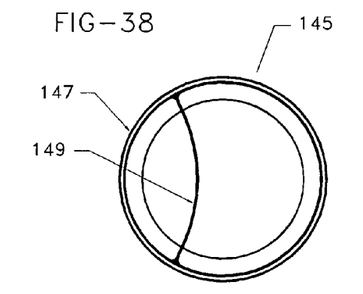
FIG. 38 depicts a top view of the container of the convenience nectar mixing and storage device with a fixed divider.
Figure 39:
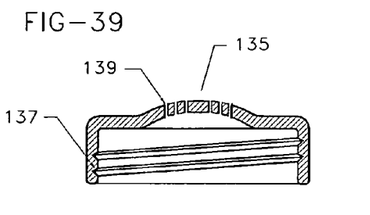
FIG. 39 depicts a half cross section, side view of the closure lid of FIG. 35.
Figure 40:
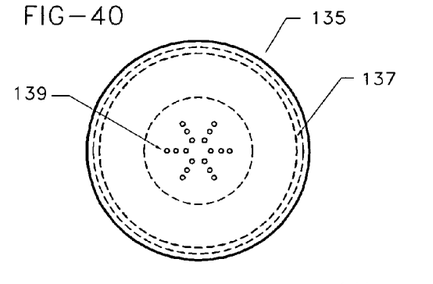
FIG. 40 depicts a top view of the closure lid of FIG. 35.
Figure 41:
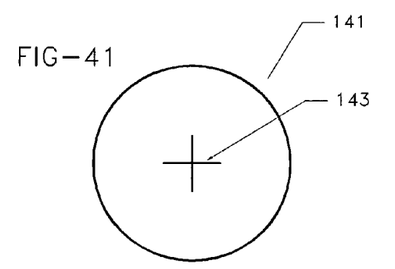
FIG. 41 depicts a top view of the lid sealing gasket of FIG. 36.
Figure 42:
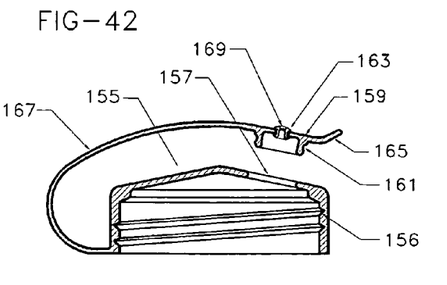
FIG. 42 depicts a half cross section, side view of an alternate design for a closure lid for the fixed divider container of the convenience nectar mixing and storage device.

Referring to the FIGS. 35-42 there is shown a convenience nectar mixing and storage device configured with a fixed divider and a relative compartment ratio of 4 (water) to 1 (sugar) for making hummingbird nectar. The device container 145 has a fixed divider 149 as shown in the FIGS. 37 and 38. The walls of the container 145 will typically have embossed or decorated graphics that specifically identify the sugar and water compartments and may also include decorative symbols that indicate that the device is intended for making hummingbird nectar. The device container has external threads 147 that are adapted to receive the internal threads 137 of the device lid 135. The device lid 135 has venting holes 139 as shown in the FIGS. 35, 39 and 40. As shown in FIGS. 36 and 40 the lid 135 is adapted to receive a seal 141 with a slit type, leak resistant valve 143. The purpose of this seal 141, and the leak resistant, slit type valve 143 is to allow the sugar and water contents of the container 145 to be mixed over the top of the fixed divider 149 by vigorous agitation or shaking, without leaking. The procedure for making hummingbird nectar with this device is essentially the same as the prior convenience nectar mixing and storage devices, except that the device container 145 needs to have the lid 135 with seal 141 screwed down tight prior to mixing. The FIG. 42 shows an alternate design for the device container 145 closure lid 155. The lid 155 has an internal thread 156 adapted to fit the device container threads 147 and a secondary opening 157 provided for convenient dispensing. The lid 155 has an attached closure plug 159 with an undercut groove 161 which is sized to snap fit into the secondary opening 157. The closure plug 159 includes an extension tab 165 to aid in opening. The closure plug 159 is connected to the lid 155 with an integrally formed strap 167. The closure plug 159 has a resilient, grommet 163 with an integrally formed slit type, pressure relieving valve at 169. This simple pressure relieving valve 169 can be covered by the index finger of the user while shake-mixing the nectar. This pressure relieving valve 169 is an important feature for this lid 155 to allow for safe microwave heating. The form of this alternate closure lid 155 design is well known in the art, but the addition of the drip resistant, pressure relieving valve 169 allows the nectar to be mixed by shaking and then safely microwave heated.

Figure 43:
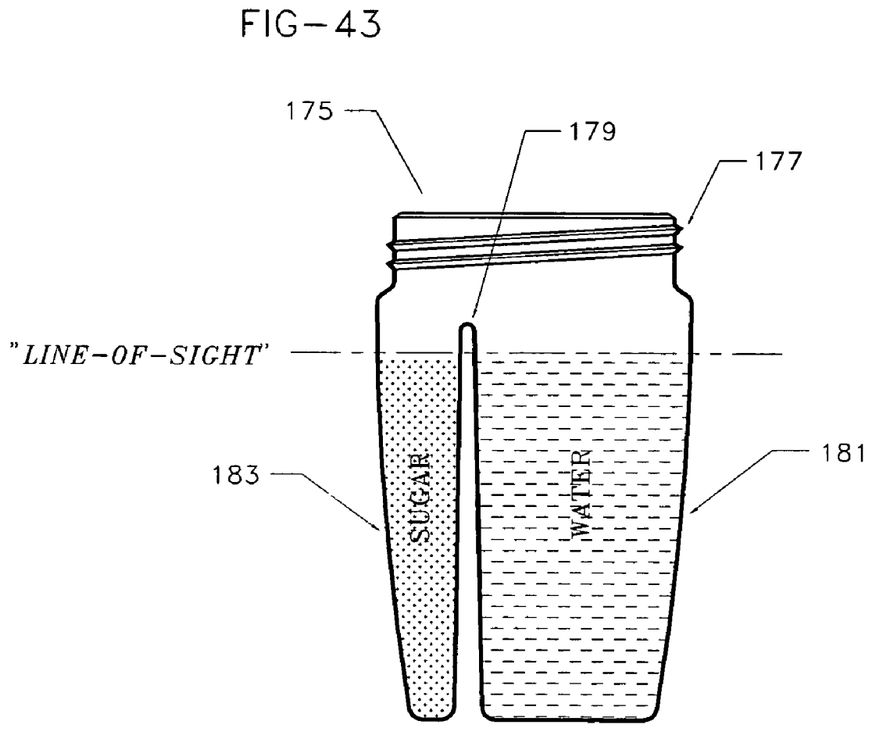
FIG. 43 depicts a side view of a blow molded, fixed divider container of the convenience nectar mixing and storage device.
Figure 44:
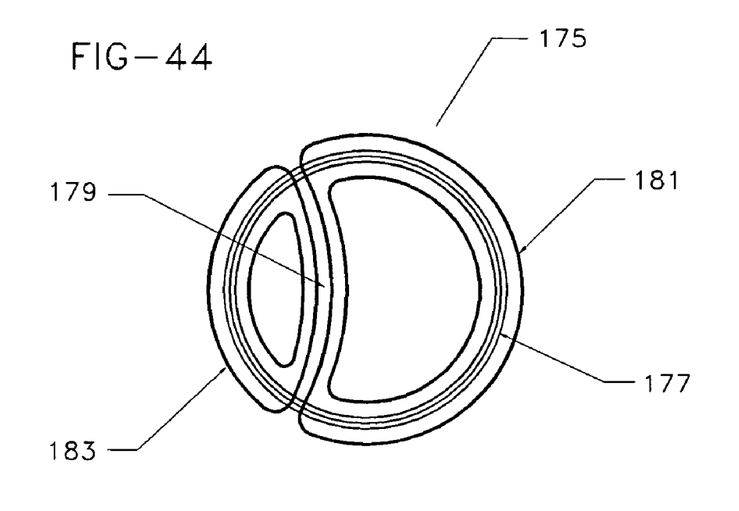
FIG. 44 depicts a top view of the container of FIG. 43.

Referring to the FIGS. 43 and 44 there is shown a blow molded configuration of the convenience nectar mixing and storage device with adjoining compartments. The device container 175 has external threads 177 and an integrally molded dividing dam 179. The container 175 has a water compartment 181 and a sugar compartment 183 having a four to one ratio respectively for the formulation of hummingbird nectar. This alternate configuration container 175 is used in similar manner to the fixed divider device 145 as detailed above.

Figure 45:
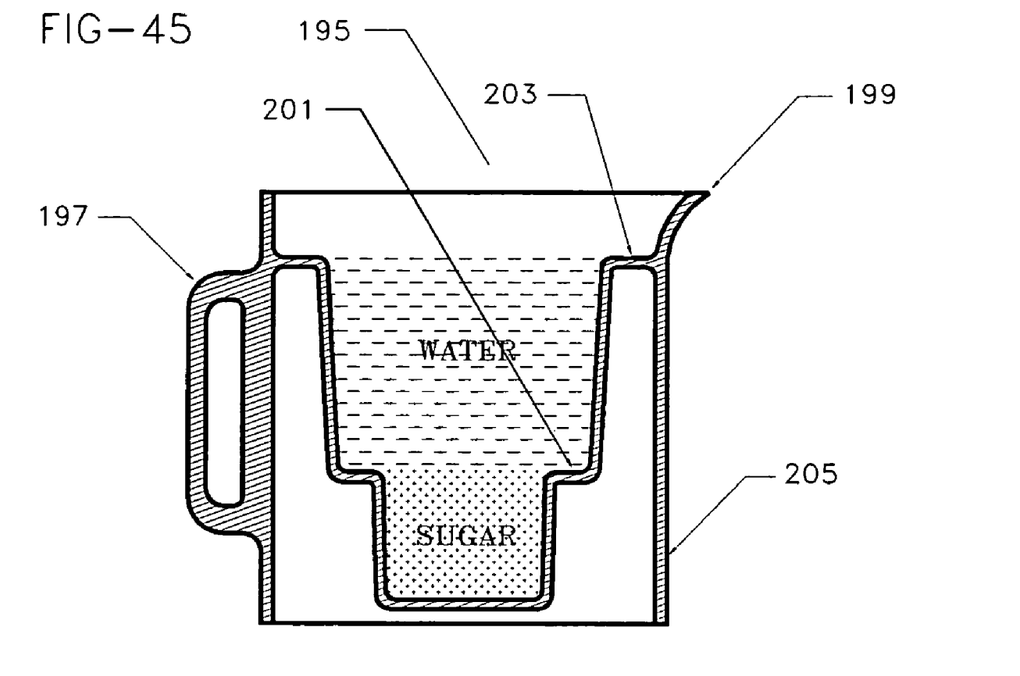
FIG. 45 depicts a half cross section, side view of a graduated volume container of the convenience nectar mixing and storage device.
Figure 46:
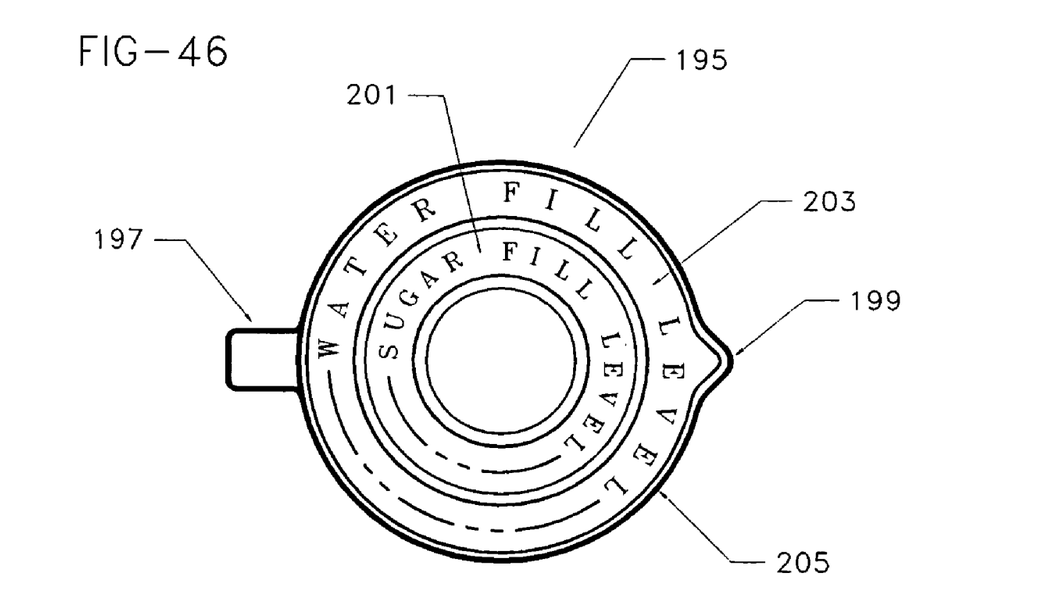
FIG. 46 depicts a top view of the container of FIG. 45.

Referring to the FIGS. 45 and 46 there is shown a graduated volume, or adjoining compartments convenience nectar mixing and storage device. The device container 195 has a handle 197 and a pouring spout 199. The device container 195 has a reduced volume compartment defined by the ledge 201 for receiving sugar. The sugar fill ledge 201 is identified with the decorated or embossed instructions: "SUGAR-FILL-LEVEL" as shown in FIG. 46. The upper adjoining water compartment is defined by the water fill ledge 203. The water fill ledge 203 is identified with the decorated or embossed instructions: "WATER-FILL-LEVEL". The procedure for making hummingbird nectar using this device is very straightforward. The lower compartment is filled with sugar to the "SUGAR-FILL-LEVEL" ledge 201, the upper compartment is then filled with water to the "WATER-FILL-LEVEL" ledge 203 and the sugar water contents of the container are stirred. Due to the fact that the sugar and water are not isolated from each other, some of the water is absorbed by the sugar in the lower sugar compartment during filling. The relative volume of water that is soaked up by the granulated sugar is approximately 40% of the sugar compartment volume. The relative volume ratio between the adjoining water and sugar compartments for this graduated volume device 195 must therefore be set close to 3.6 parts (water) to 1 part (sugar) to correctly formulate hummingbird nectar. The device is specifically configured to allow the water to be poured directly into the sugar compartment to aid in mixing the solution and to assure that the sugar is thoroughly "wefted" during filling. A convenience nectar mixing and storage device of this graduated volume configuration, requires that a full container of hummingbird nectar is prepared each time in order to achieve the correct sugar to water concentration. The device container 195 as shown in the FIGS. 45 and 46 is shown having a cylindrical shape, but the device could be made in many other functional shapes. In order for this device to be used to make nectar with an accurate formulation, the graduated features of the container that indicate the fill levels, should be sufficiently pronounced and specifically identified to ensure accurate filling levels. The graduated features of the container that define the sugar and water fill levels may alternately be located in the center, as an upstanding, stepped pinnacle form, or at the container ends, but are not by any necessity limited to the outer edges. The drawing FIG. 45 does not show a lid or top to the device container 195, but typically a lid with an incorporated steam vent and convenient dispensing, or secondary opening would be provided.

Although not specifically shown in the drawing figures the various convenience nectar mixing and storage devices would typically have detailed instructions for their use either embossed or decorated on the container or associated covering lid. The container lids would also have embossed or decorated warnings such as "HOT" at or adjacent to steam venting features. At the present time there is general agreement among those in the bird feeder trade as advised by Ornithologists that the recommended sugar to water ratios for Hummingbird and oriole nectar are 1 part (sugar) to 4 parts (water) and 1 part (sugar) to 6 parts (water) respectively. Unfortunately, recommendations for the formulation of butterfly nectar are widely variable. These "recommended" butterfly nectar sugar to water mix ratio recipes range from 1 part (sugar) to 4 parts (water) all the way up to 1 part (sugar) to 20 parts (water). It is most probable that as the nectar feeding of butterflies becomes more established, a consistent nectar formulation recommendation, will emerge. In the mean time, the most reasonable approach to setting the butterfly nectar sugar to water ratio for the convenience nectar mixing and storage device(s) will be to survey the leading butterfly feeder manufactures.

It should be noted that in any embodiment of the CONVENIENCE NECTAR MIXING AND STORAGE DEVICE(S), the container and associated divider may have graduation marks to assist in setting the same level for the water and sugar. Since it is usually recommended that the nectar solutions be boiled to preserve them longer from spoilage and the development of molds, the CONVENIENCE NECTAR MIXING AND STORAGE DEVICE(S) should be constructed of heat resistant materials and preferably these materials should be compatible with microwave heating.

It should be noted that a CONVENIENCE NECTAR MIXING AND STORAGE DEVICE(S) that are "not-compartmentalized" but which use graphics or embossing to designate the "sugar-fill-level" and resultant mixed sugar-water or "fill to" (full) level are anticipated by this invention. A CONVENIENCE NECTAR MIXING AND STORAGE DEVICE of this type would have different "sugar-fill-level" graphics on 2 or 3 sides/locations to make the three (3) standard nectar (sugar-water) ratios.

The non-compartmentalized CONVENIENCE NECTAR MIXING AND STORAGE DEVICE(S) would by necessity require that a full batch of nectar be prepared every time. It should also be pointed out that a "non-compartmentalized" CONVENIENCE NECTAR MIXING AND STORAGE DEVICE(S) will not be as inherently accurate in controlling the nectar (sugar to water) mix ratios(s)—as the device "sugar-fill-line" would typically cover a larger area at the bottom of the device.

The foregoing description is not intended to be all inclusive of the embodiments that a CONVENIENCE NECTAR MIXING AND STORAGE DEVICE may have. The device itself, once disclosed, may be configured in a variety of embodiments that operate similarly to those detailed and described herein. I desire therefore, that my protection be limited, not by the constructions illustrated and described, but only by the proper scope of the appended claims.

I claim:

1. A convenience nectar mixing and storage device for use in the preparation of sugar-water nectar for feeding hummingbirds, orioles or butterflies, said device comprising:
    a container having two adjoining compartments, the first compartment adapted to receive sugar,
    the second compartment adapted to receive water,
    wherein said first compartment has a volume that is proportionately less than the volume of said second compartment by a ratio established for the formulation of sugar water nectar for hummingbirds, orioles, or butterflies,
    wherein said container is specifically adapted or disposed to allow for the mixing of the sugar and water to occur to provide said sugar-water nectar.

2. A device according to claim 1, wherein the ratio of the volume of said first compartment to the volume of said second compartment is selected from the group consisting of approximately one to four (hummingbird nectar), and approximately one to six (oriole nectar), and approximately one to nine (butterfly nectar).

3. A device according to claim 1, wherein said sugar and water compartments are separated by a moveable divider that is integrally formed within said container.

4. A device according to claim 1, wherein said sugar and water compartments are separated by a moveable or removable divider with engagement means integrally formed or fitted with said container.

5. A device according to claim 1, wherein said sugar and water compartments are separated by a fixed divider that is integrally formed within said container.

6. A device according to claim 5, wherein said device container is adapted for a closure lid, said closure lid allowing for shake mixing of the sugar and water to occur over said fixed divider to provide said sugar water nectar.

7. A device according to claim 6, wherein said closure lid is provided with a spill resistant steam venting means.

8. A device according to claim 6, wherein said closure lid is provided with a secondary opening to facilitate dispensing.

9. A device according to claim 1, wherein said container is provided with a handle or handling feature and pouting spout.

10. A device according to claim 1, wherein said container is embossed or otherwise decorated with symbols or words indicating the device is to be used to make specific formulations of sugar water nectar.

11. A device according to claim 1, wherein said adjoining sugar and water compartments are formed with distinctly shaped transitions or ledges within said container that clearly delineate their respective fill levels, and wherein filling the second compartment with water results in the mixing of the sugar water nectar.

12. A device according to claim 11, wherein the ratio of the volume of said sugar compartment to the volume of said water compartment is approximately one (1.0) to three-point-six (3.6) for the preparation of hummingbird nectar.

* * * * *